(12) United States Patent
Dodson

(10) Patent No.: US 9,767,278 B2
(45) Date of Patent: Sep. 19, 2017

(54) METHOD AND APPARATUS FOR DETECTING IRREGULARITIES ON A DEVICE

(71) Applicant: Elasticsearch B.V., Mountain View, CA (US)

(72) Inventor: Stephen Dodson, London (GB)

(73) Assignee: Elasticsearch B.V., Mountain View, CA (US)

( * ) Notice: Subject to any disclaimer, the term of this patent is extended or adjusted under 35 U.S.C. 154(b) by 0 days.

(21) Appl. No.: 14/484,633

(22) Filed: Sep. 12, 2014

(65) Prior Publication Data

US 2015/0082437 A1 Mar. 19, 2015

(30) Foreign Application Priority Data

Sep. 13, 2013 (GB) .................................... 1316319.1

(51) Int. Cl.
  *G06F 11/00* (2006.01)
  *G06F 21/55* (2013.01)

(52) U.S. Cl.
  CPC .................................. *G06F 21/552* (2013.01)

(58) Field of Classification Search
  CPC ..................................................... G06F 21/552
  USPC ......................................................... 726/23
  See application file for complete search history.

(56) References Cited

U.S. PATENT DOCUMENTS

| | | | |
|---|---|---|---|
| 5,511,164 A | 4/1996 | Brunmeier et al. | |
| 5,905,892 A | 5/1999 | Nielsen et al. | |
| 6,012,152 A | 1/2000 | Douik et al. | |
| 6,820,251 B1 | 11/2004 | Dwyer | |
| 7,200,773 B2 | 4/2007 | Luick | |
| 7,280,988 B2 | 10/2007 | Helsper et al. | |
| 7,309,833 B2 | 12/2007 | Robeson et al. | |
| 7,451,210 B2 | 11/2008 | Gupta et al. | |
| 8,543,689 B2 | 9/2013 | Dodson | |
| 8,990,944 B1* | 3/2015 | Singh | G06F 21/56 726/24 |
| 2002/0184533 A1* | 12/2002 | Fox | H04L 63/102 726/1 |
| 2005/0080806 A1 | 4/2005 | Doganata et al. | |
| 2005/0086529 A1 | 4/2005 | Buchsbaum | |

(Continued)

FOREIGN PATENT DOCUMENTS

| | | |
|---|---|---|
| AU | 5142098 A | 6/1998 |
| BR | 9713153 A | 2/2000 |

(Continued)

OTHER PUBLICATIONS

J. Blount, "Adaptive Rule-Based Malware Detection Employing Learning Classifier Systems," Thesis, Missouri University of Science and Technology (2011).

(Continued)

*Primary Examiner* — Mohammad W Reza
(74) *Attorney, Agent, or Firm* — Carr & Ferrell LLP

(57) ABSTRACT

A system and method for the detection of irregularities, such as fraud or malware, running on a device, is disclosed. The system comprises a monitoring program for reviewing data relating to operation of the device, a device profile including data items relating to typical operation of the device generated from messages relating to the device; and an alert module for generating an alert on detection of unusual activity relating to the device.

4 Claims, 4 Drawing Sheets

(56) References Cited

U.S. PATENT DOCUMENTS

| | | |
|---|---|---|
| 2006/0020924 A1 | 1/2006 | Lo et al. |
| 2006/0259967 A1 | 11/2006 | Thomas et al. |
| 2006/0282895 A1 | 12/2006 | Rentzis et al. |
| 2008/0141371 A1 | 6/2008 | Bradicich et al. |
| 2009/0049335 A1 | 2/2009 | Khatri et al. |
| 2009/0177692 A1 | 7/2009 | Chagoly et al. |
| 2011/0145400 A1 | 6/2011 | Dodson |
| 2012/0188087 A1 | 7/2012 | Wang |
| 2013/0030875 A1* | 1/2013 | Lee .................. G06Q 10/06311 |
| | | 705/7.38 |
| 2013/0144914 A1* | 6/2013 | Libal ........................ G06F 17/30 |
| | | 707/784 |
| 2013/0305357 A1* | 11/2013 | Ayyagari ................ H04L 63/14 |
| | | 726/22 |
| 2014/0157405 A1* | 6/2014 | Joll ..................... H04L 63/1425 |
| | | 726/22 |
| 2014/0201732 A1* | 7/2014 | Haag .................. G06F 9/45533 |
| | | 718/1 |
| 2014/0223554 A1* | 8/2014 | Roden, III ............ G06F 21/577 |
| | | 726/22 |

FOREIGN PATENT DOCUMENTS

| | | |
|---|---|---|
| CA | 2272609 A1 | 6/1998 |
| EP | 2 129 076 | 12/2009 |
| EP | 2360590 A2 | 8/2011 |
| GB | 2519941 A | 5/2015 |
| WO | WO9824222 A2 | 6/1998 |
| WO | 2013/177311 | 11/2013 |

OTHER PUBLICATIONS

Search Report dated Mar. 3, 2015 in Application No. GB1316319.1, filed Sep. 13, 2013, 7 pages.
Extended European Search Report dated Sep. 22, 2011 in Application No. EP10194379.3, 6 pages.
European Office Action dated Sep. 20, 2013 in Application No. 10194379.3, filed Aug. 24, 2011, 2 pages.
Summons to Attend Oral Proceedings dated Oct. 7, 2015 in Application No. 10194379.3, filed Aug. 24, 2011, 9 pages.

* cited by examiner

METHOD AND APPARATUS FOR DETECTING IRREGULARITIES ON A DEVICE

CROSS-REFERENCE TO RELATED APPLICATIONS

The present application claims priority to and the benefit of the filing date of British Patent Application No. GB1316319.1. This application is related to U.S. patent application Ser. No. 12/965,226 entitled "Apparatus and Method for Analyzing a Computer Structure", filed on 10 Dec. 2010. The foregoing applications are hereby incorporated by reference in their entirety.

BACKGROUND OF THE INVENTION

Field of the invention

This application relates to an apparatus and a method for detection of irregularities on a device, such irregularities include but are not limited to malware or fraud.

Brief Description of the Related Art

The term "malware" is short for "a malicious software" and is software that is used or programmed to disrupt operation of an individual computer and/or computer network, to gather sensitive information or to gain access to private computer systems. The malware can appear in the form of code, scripts, active content, and other software. The malware includes, but is not limited to, computer viruses, ransomware, worms, Trojan horses, rootkits, keyloggers, dialers, spyware, outware, rock security software. The majority of active malware threats are usually worms or Trojans, rather than viruses.

As attacks by malware become more frequent, programs and methods have been developed specifically to combat the malware. One commonly used approach is to install a scanner onto a user's computer, which hooks deep into the operating system and functions in a manner similar to the way in which the malware itself would attempt to operate. The scanner, on attempted access of a file, checks if the accessed file is a legitimate file, or not. The access operation would be stopped if the file is considered to be malware by the scanner and the file will be dealt with by the scanner in a pre-defined way. A user will generally be notified. This approach may considerably slow down speed of operation the operating system and depends on the effectiveness of the scanner.

Another approach to combatting malware is to attempt to provide real-type protection against the installation of the malware on the user's computer. This approach scans the incoming network data for a malware and blocks any threats identified.

Empty-malware software programs can be used for detection and removal of the malware that has already been installed onto computer. This approach scans the contents of the operating system registry, operating system files and installed computer programs on the user's computer and provides a list of any identified threats, allowing the user to choose which ones of the files to delete or keep, or to compare this list to a list of known malware and removing the related files.

Typically, malware products detect the malware based on heuristics or on signatures. Other malware products maintain a black list and/or a white list of files that are known to be related to the malware.

Methods of detecting malware using a plurality of detection sources to detect potential attacks of malware are known. The use of more than one detection source enables a more reliable decision to be made about whether a computer network is under attack. For example, US patent application publication No. US 2006/0259967 (Thomas et al.) teaches a method for determining whether a network is under attack by sharing data from several event detection systems and passing the suspicious event data to a centralized location for analysis. The suspicious event data is generated in an event valuation computer including an evaluation component. The evaluation component analyses the suspicious events observed in the network and quantifies the likelihood that the network is infected or under attack by malware. The evaluation component can, in one aspect of the disclosure, determine whether the number of suspicious events in a given timeframe is higher than a predetermined threshold. The evaluation component may also analyze metadata generated by the event detection systems and thereby calculate a suspicious score representing the probability that the network is infected or under attack.

US patent application publication No. 2008/0141371 (Bradicich et al.) discloses a method and system for heuristic malware detection. The detection method includes merging a baseline inventory of file attributes for a number of files from each client computing system. The method includes receipt of an updated inventory of file attributes in a current inventory survey from different ones of the clients. Each received inventory survey can be compared to the merged inventory and, in response to the comparison, a deviant pattern or file attribute changes can be detected in at least one inventory survey for a corresponding one of the clients. The deviant pattern can be classified as one of a benign event or a malware attack.

Similarly, a thesis by Blount entitled "Adaptive rule-based malware detection employing learning classifier systems", Missouri University of Science and Technology, 2011, discloses a rule-based expert system for the detection of malware with an evolutionary learning algorithm. This creates a self-training adaptive malware detection system that dynamically evolves detection rules. The thesis uses a training set to train the algorithm.

SUMMARY OF THE INVENTION

A system for the detection of irregularities of a device is taught in this specification. This system comprises a monitoring program for reviewing data relating to operation of the device, a device profile including data items relating to typical operation of the device; and an alert module for generating an alert on detection of irregularity relating to the device.

The data items comprise at least one of ports associated with processes, addresses of connectable devices, volumes of data and the irregularities are one or more of malware or fraud.

A method for the detection of irregularities of a device is also taught. The method comprises detecting a plurality of data items relating to the operation of the device, comparing the detected plurality of data items with a device profile, and generating an alert on detection of irregularities.

The method can also comprise updating the device profile by monitoring the data items over a period of time and generating data items for storage in the device profile.

DESCRIPTION OF THE FIGURES

For a more complete understanding of the present invention and the advantages thereof, reference is now made to the following description and the accompanying drawings, in which.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

Figure 1:
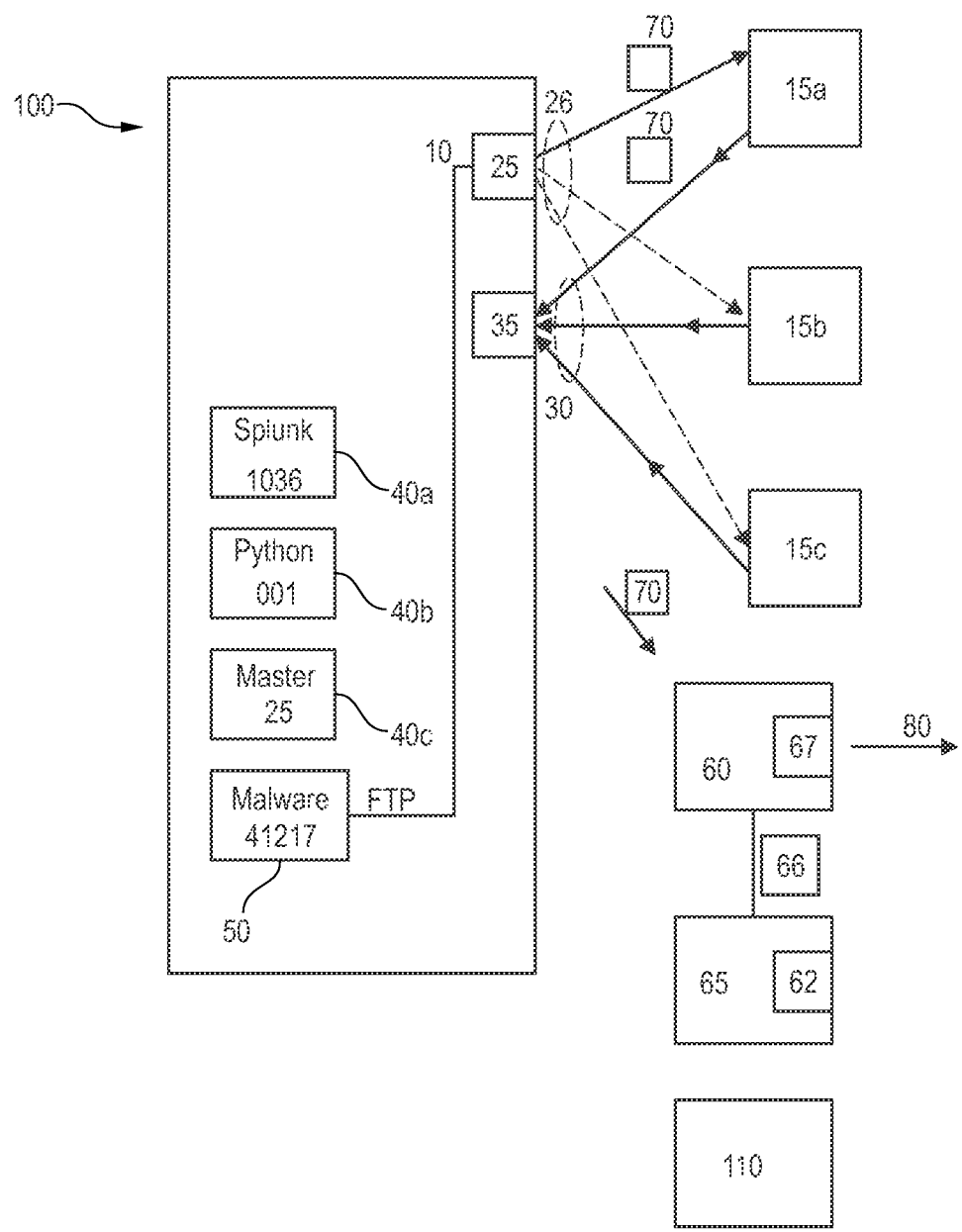
FIG. 1 shows an overview of a user computer connected to a network.

FIG. 1 shows a user computer 10 with a plurality of outgoing connections 26 and a plurality of incoming connections 30 in a computer network 100. The outgoing connections 26 and the incoming connections 30 are connected to one or more servers 15a-c using, for example, a TCP protocol. A plurality of processes 40a-c are running on the user computer 10. The processes 40a-c include regular processes, such as, but not limited to a Splunk process 40a, a Python process 40b, and a master process 40c. Each one of the regular processes 40a-c will use one or more of the ports of the outgoing ports 25 or the incoming ports 35. The typical port number is shown in the schematic boxes illustrating the processes 40a-c.

A malware 50 may be operating on the user's computer 10. The malware 50 could be a specially developed piece of software code or could be a regular piece of code and will generally also run as a process. The malware 50 is also connected to one or more of the outgoing ports 25 or the incoming ports 35. In the aspect of the invention shown in FIG. 1, it is assumed that the malware 50 is a process in the user computer 10 running a file transfer protocol using the outgoing port 41217. The malware could also be a modified version of an existing piece of code.

A monitoring program 60 installed within the network 100 in which the user computer 10 is operating continually monitors the network 100 and the user computer 10 as well as messages 70 exchanged within the network 100 and/or generated by the user computer 10. The monitoring program 60 uses a variety of data sources for performing the monitoring.

The monitoring program 60 uses data sources based on network flow traffic statistics through the computer network 100. These data sources include proxy logs and NetFlow records, which record the destination of data sent through the outgoing ports 25 and the source of incoming data received through the incoming ports 35. The monitoring program 60 analyzes headers in the data records and can also investigate which browsers are being run on the user computer 10.

Many computer networks 100 also have a DNS server 110 located in the private network, as well as having access to public DNS servers. The DNS server 110 includes a variety of data log entries, including time stamps, indicating which ones of the user computers 10 attempted to access which web sites or external servers at which period of time.

The monitoring program 60 can also review headers in emails and/or other messages 70 sent throughout the computer network 100. The email headers will include information, such as the time, the destination and the source, as well as having information about the size of the email.

It will be appreciated that these data sources are merely exemplary and that other data sources can be used or supplied. Only a single user computer 10 is shown in FIG. 1 for simplicity. In practice, there will be a large number of user computers 10 and servers 15a-c. It will be appreciated that the network 100 may also contain other devices that can generate messages 70 or other data.

The monitoring program 60 creates a user profile 62, stored in a user profile database 65 attached to the monitoring program 60, for each one of the user computers 10 using the plurality of data sources. It will be appreciated that the user profile database 65 contains more than one user profile 62. The user profile 62 in the user profile database 65 receives data items 66, that indicate how the user computer 10 generally reacts with the network 100 as well as with servers 15a-c and other devices in the network 100. For example, the user profile 62 identifies which ones of the outgoing ports 25 and the incoming ports 35 are typically used by the user computer 10 for which processes 40. The user profile 62 will continually be updated as new ones of the data items 66 relating to activity of the user computer 10 are generated. The user profile 62 creates in essence a baseline from which the 'normal' can be deduced.

Suppose now that the malware process 50 starts on the user computer 10. The monitoring program 60 will receive further data items that indicate that behavior of the user computer 10 deviates from the behaviour expected by comparison the user profile 62 stored in the user profile database 65. Non limiting examples of such deviant behaviour include massive amounts of data being transferred to one of the servers 15a-c, or continual access to a new website. The monitoring program 60 can notify an administrator of a possible malware infection of the user computer and the administrator can investigate the user computer 10.

Figure 2:
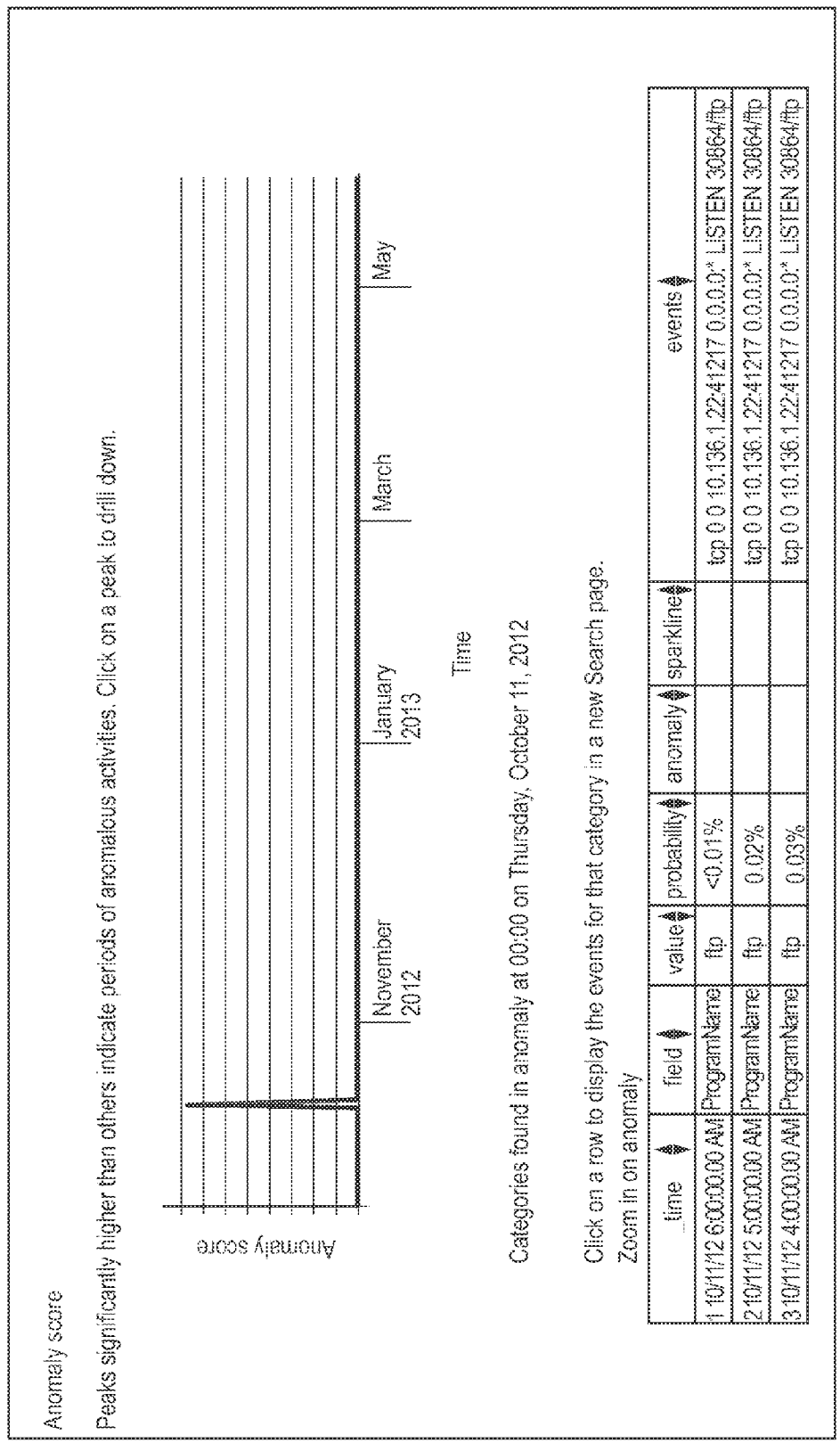
FIG. 2 shows an example of messages generated by the user computer.

An example is shown in FIG. 2. FIG. 2 shows how the monitoring system reports anomalous behaviour. On Thursday October 2012, an ftp process 40 started on a server 15a-c. This process 40 was unusual compared to the normal network processes 40a-c running on this server. The monitoring program 60 automatically identified this and reported this as a non-zero anomaly score.

Figure 3:
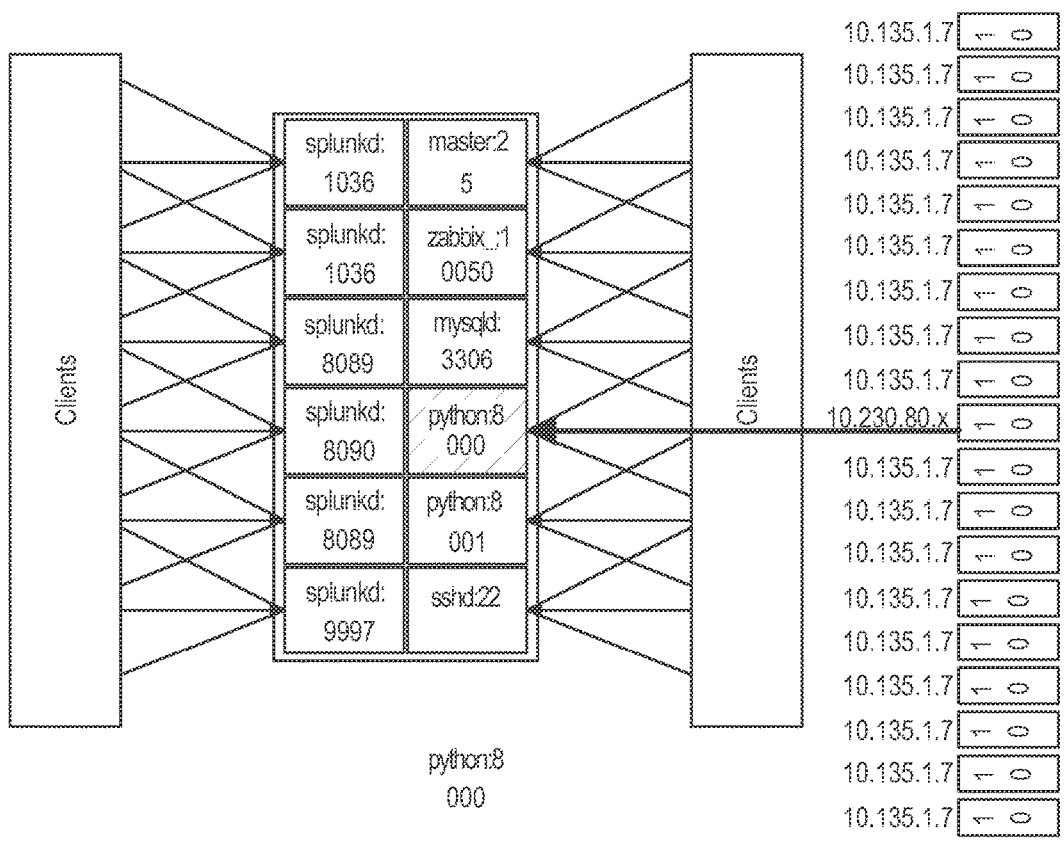
FIG. 3 shows an example of connections to services

Another example is shown in FIG. 3. in which two user computers 10 connected to a server 15 running a plurality of processes 40. One of the processes 40m connects generally to the same IP address 10.135.1.7. However in one instance this connects to an IP address 10.230.80.46(shown in FIG. 3 as 10.230.80.x), which is unexpected. This unexpected connection will be picked up by the monitoring program 60 and reported to the administrator.

The monitoring program 60 can also review attempts to connect to the user computer 10 through various ones of the incoming ports 35. For example, incoming requests for a particular process 40a-c would be expected on several ones of the incoming ports 35. An attempt to connect to a particular process 40 would be detected by the monitoring program 60 and indicated to the administrator. The monitoring program 60 would identify that a connection to a particular process through a particular port 25 has never or rarely been seen is a deviant behaviour and generate via alert module 67, an alert 80 for the administrator.

Figure 4:
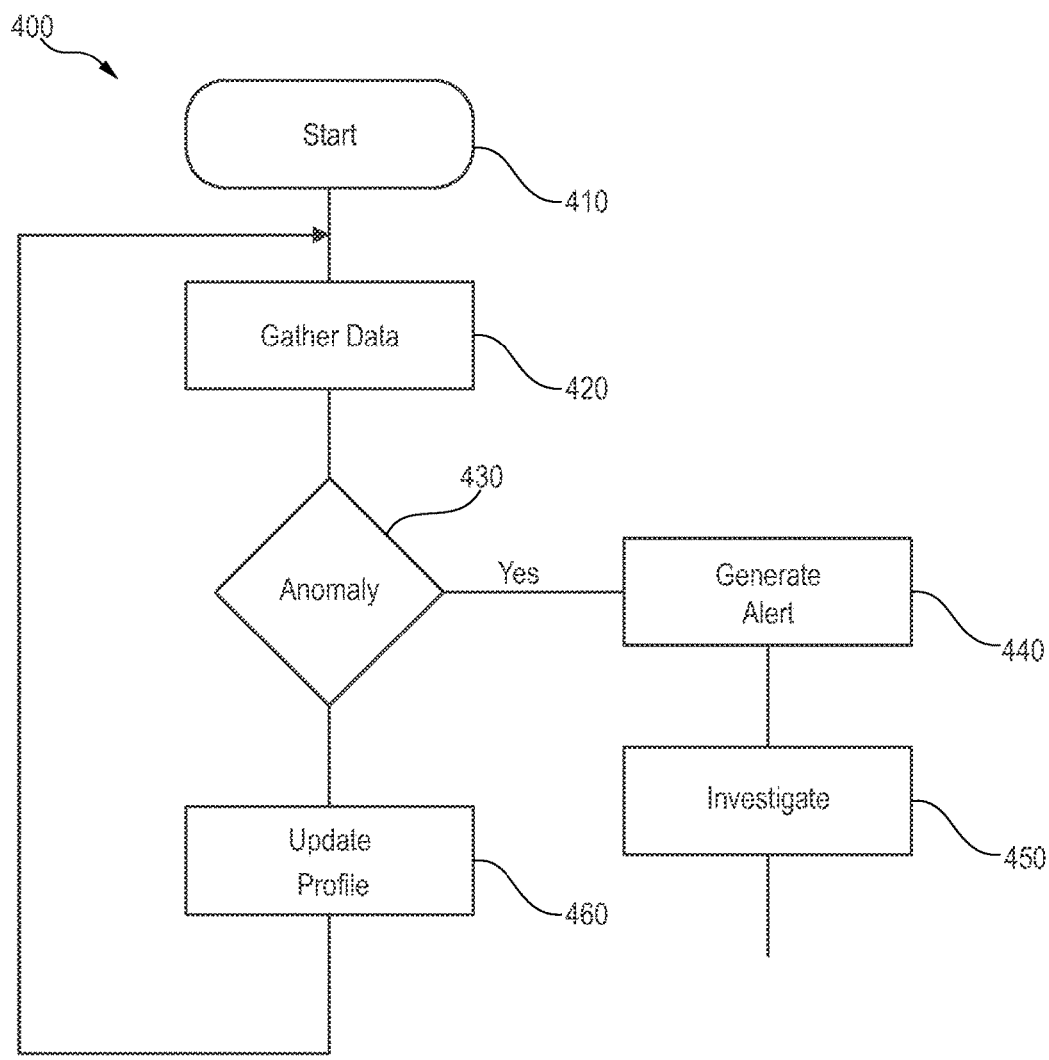
FIG. 4 shows a flow diagram of the method.

FIG. 4 shows an outline of a process 400 for the detection of irregularities, such as malware. The process 400 starts at 410 and in step 420 data from the various data sources is gathered. In step 430 the gathered data is compared with one or more of the user profiles 62 and, if an anomaly is discovered, an alert is generated in step 440 such that the administrator can investigate in step 450. In step 460, the user profile 62 is updated from the newly gathered data items. The user profile 62 will also be updated using data relating to the anomaly.

The updating of the user profile 62 in step 460 ensures that the user profile 62 is continually adapted to new devices or other computers inserted into the computer network 100 and/or changes to the processes 40*a-c* running on the user computer.

In a further aspect of the invention, the system and method can be used to detect other irregularities on the user computer 10 or in the computer network 100. It would be possible, for example, to use the teachings of a disclosure to detect fraud by users of the user computer 10. The fraud can be detected by, for example, identifying anomalous attempts to access certain websites, which are not normally accessed, or, by an attempt to transfer significant amounts of data to a computer or memory device that is not normally in use, or by the generation of a large number of emails in a particular period of time.

The detection of fraud is made by detection of unusual activity in the user profile 62. One method for identifying fraud is by comparing the different ones of the user profiles 62 of different users of the computer. If one of the user profiles 62 is substantially different than other ones of the user profiles 62, then notification can be made to an administrator or a fraud officer to investigate the user and the user computer 10. Another method for identifying fraud is if the user profile 62 suddenly changes.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A system for the detection of irregularities of a device, the system comprising:
   a hardware processor; and
   a memory communicatively coupled with the hardware processor, the memory storing instructions which when executed by the hardware processor performs a method, the method comprising:
     creating, by a monitoring program, a device baseline profile comprising data items relating to a typical operation of the device, the data items comprising at least two of:
       (i) ports associated with processes,
       (ii) addresses of connectable devices, and
       (iii) volumes of data;
     storing, in a user profile database, the device baseline profile;
     receiving, by the monitoring program, new ones of data items indicative of a current operation of the device;
     determining, by the monitoring program, whether the new ones of data items deviate from the typical operation of the device by comparing the new ones of data items to the stored device baseline profile;
     based on the determining, updating, by the monitoring program, the stored device baseline profile to create an updated device baseline profile with the new ones of data items if the new ones of data items do not deviate from the typical operation of the device; and
     based on the determining, generating, by an alert module, an alert based on detection of the deviating from the typical operation of the device, the deviating from the typical operation of the device being transferring unusual amounts of data, continually accessing a new website, connecting to an unexpected IP address, or using an infrequently used port.

2. The system of claim 1, wherein the irregularities are one or more of malware or fraud.

3. A method for the detection of irregularities of a device, the method comprising:
   reviewing, by a monitoring program, data items of a device;
   detecting, by the monitoring program, a plurality of the data items relating to a typical operation of the device;
   creating, by the monitoring program, a device baseline profile including the plurality of the data items relating to the typical operation of the device, the plurality of the data items comprising at least two of:
     (i) ports associated with processes,
     (ii) addresses of connectable devices, and
     (iii) volumes of data;
   receiving, by the monitoring program, new ones of data items indicative of a current operation of the device;
   determining, by the monitoring program, whether the new ones of data items deviate from the typical operation of the device by comparing the new ones of data items to the device baseline profile;
   based on the determining, updating, by the monitoring program, the device baseline profile to create an updated device baseline profile with the new ones of data items if the new ones of data items do not deviate from the typical operation of the device; and
   based on the determining, generating an alert based on the determining of the deviating from the typical operation of the device, the deviating from the typical operation of the device being transferring unusual amounts of data, continually accessing a new website, connecting to an unexpected IP address, or using an infrequently used port.

4. A method for the detection of irregularities in a network, the network comprising at least one computer having a plurality of outgoing connections and a plurality of incoming connections connected to one or more servers and wherein a plurality of processes are running on the at least one computer, the method comprising the steps of:
   continuously receiving, by a monitoring program, data items relating to the network, the computer, and messages exchanged within the network, the monitoring program connected to the network;
   automatically reviewing, by the monitoring program, the received data items;
   detecting a plurality of the data items relating to a typical operation of a device;
   creating, by the monitoring program, and storing in a database a device baseline profile including the plurality of the data items relating to the typical operation of the device connected to the network, the plurality of the data items comprising at least two of:
     (i) ports associated with processes,
     (ii) addresses of connectable devices, and
     (iii) volumes of data;

receiving, by the monitoring program, new ones of data items indicative of a current operation of the device;

determining, by the monitoring program, whether the new ones of data items deviate from the typical operation of the device by comparing the new ones of data items to the stored device baseline profile;

based on the determining, updating, by the monitoring program, the stored device baseline profile to create an updated device baseline profile with the new ones of data items if the new ones of data items do not deviate from the typical operation of the device; and based on the determining, generating an alert based on the determining of the deviating from the typical operation of the device, the deviating from the typical operation of the device being transferring unusual amounts of data, continually accessing a new website, connecting to an unexpected IP address, or using an infrequently used port.

\* \* \* \* \*